Patented Apr. 24, 1945

2,374,479

UNITED STATES PATENT OFFICE 2,374,479

INSECTICIDE

Samuel I. Gertler and Herbert L. J. Haller, Washington, D. C., assignors to Claude R. Wickard, as Secretary of Agriculture of the United States of America, and his successors in office No Drawing. Application September 4, 1942, Serial No. 457,295

1 Claim. (Cl. 167—30)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This is a continuation in part of our application for patent filed October 9, 1940, Serial No. 360,360.

This invention relates to materials for destroying and checking the growth or multiplication of living plant and animal organisms that are economically injurious to man.

An object of this invention is to provide materials suitable for use as insecticides.

Another object of the invention is to provide such materials which will not cause injury to foliage when dusted or sprayed on delicate vegetation, such as bean plants, peach trees, plants grown under glass, and so forth.

Another object of the invention is to provide materials of the type mentioned which are relatively nontoxic to man and domestic animals when taken by mouth, and which can be used in place of lead arsenate and other arsenicals for destroying insects, without leaving harmful residues on fruits and vegetables.

We have found that substances belonging to the class of organic compounds known as semicarbazones have a specific toxic effect upon insects, and our invention embraces the application of said substances to the destruction of insects.

Semicarbazones are formed by the condensation of ketones with semicarbazide. Suitable products according to this invention are semicarbazones having the formula:

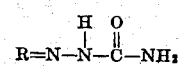

where R represents a cyclo-aliphatic radical, which may have a methyl substituent.

These products may be dissolved in a suitable solvent or emulsified with a suitable agent or adsorbed on a suitable powder or dust, such as clay, talc, bentonite, and so forth. They may also be employed in admixture with pyrethrum, derris, nicotine, arsenicals and other insecticides.

The value of these compounds as insecticides is shown by the following examples:

Example 1

Cyclopentanone semicarbazone was found to be toxic to newly hatched screwworm larvae at a concentration of 0.10%. When fed to Hawaiian beet webworm larvae of the fifth instar on Swiss chard leaves, it showed a much higher toxicity after 48 hours than derris. It also compared favorably with lead arsenate against the codling moth. When sprayed on squash plants and fed to the fifth instar of the melon worm it gave as high a kill in the same concentration after two days as derris gave after four days. The compound, dusted on Swiss chard leaves and fed to the fifth instar of the Southern beet webworm gave 100% kill in 48 hours.

Example 2

Cyclohexanone semicarbazone was toxic to newly hatched screwworm larvae at a concentration of 0.05%. When dusted on Swiss chard leaves and fed to the fifth instar of the Hawaiian beet webworm it showed 100% kill in 48 hours. When dusted on collard leaves and fed to the cross-striped cabbage worm of the fifth instar, 100% kill was obtained in 48 hours, whereas derris had no effect at all in this period of time. When dusted on Swiss chard leaves against the southern beet webworm of the fifth instar, 100% kill was obtained in 48 hours. Melon worm of the fourth instar when fed pumpkin leaves dusted with this compound showed a 100% mortality in 72 hours.

Example 3

Methylcyclohexanone semicarbazone, dusted on collard leaves, when fed to the southern army worm of the fourth instar, gave a 100% kill in 48 hours.

The compounds and examples above are given by way of illustration and not by way of limitation. The examples are not to be construed as limiting either the method of application of the insecticide or the kinds of insects to which it may be applied.

Having thus described our invention, we claim:

The method of controlling insects comprising exposing the insects to a compound of the general formula

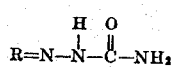

where R represents a member chosen from the group consisting of a cyclo-aliphatic radical and a cyclo-aliphatic radical having a methyl substituent.

SAMUEL I. GERTLER.
HERBERT L. J. HALLER.